United States Patent
Yang et al.

(10) Patent No.: US 9,203,544 B2
(45) Date of Patent: Dec. 1, 2015

(54) OPTICAL COMMUNICATION SYSTEM, DEVICE AND METHOD EMPLOYING ADVANCED CODING AND HIGH MODULATION ORDER

(75) Inventors: Qi Yang, Wuhan (CN); Wu Liu, Wuhan (CN); Zhixue He, Wuhan (CN); William Shieh, Victoria (AU); Ivan B. Djordjevic, Tucson, AZ (US); Zhu Yang, Wuhan (CN); Shaohua Yu, Wuhan (CN)

(73) Assignee: WUHAN RESEARCH INSTITUTE OF POSTS AND TELECOMMUNICATIONS, Wuhan, Hubei Province (CN)

( * ) Notice: Subject to any disclaimer, the term of this patent is extended or adjusted under 35 U.S.C. 154(b) by 249 days.

(21) Appl. No.: 12/959,689

(22) Filed: Dec. 3, 2010

(65) Prior Publication Data

US 2012/0141135 A1 Jun. 7, 2012

(51) Int. Cl.
| | |
|---|---|
| *H04B 10/516* | (2013.01) |
| *H04J 14/02* | (2006.01) |
| *H04J 14/06* | (2006.01) |
| *H04L 1/00* | (2006.01) |

(52) U.S. Cl.
CPC .......... *H04J 14/0298* (2013.01); *H04B 10/516* (2013.01); *H04J 14/02* (2013.01); *H04J 14/06* (2013.01); *H04L 1/0065* (2013.01); *H04J 14/0279* (2013.01)

(58) Field of Classification Search
USPC .......................................... 398/186, 188, 202
See application file for complete search history.

(56) References Cited

U.S. PATENT DOCUMENTS

| 6,154,095 A | * | 11/2000 | Shigemori et al. ............... 331/16 |
| 7,548,564 B2 | | 6/2009 | Hyun et al. |
| 7,992,070 B2 | * | 8/2011 | Djordjevic et al. ........... 714/755 |
| 8,218,979 B2 | | 7/2012 | Liu |
| 8,385,439 B2 | | 2/2013 | Djordjevic et al. |
| 2004/0047433 A1 | * | 3/2004 | Mogre et al. .................. 375/308 |

(Continued)

FOREIGN PATENT DOCUMENTS

| CN | 101228755 | 7/2008 |
| CN | 101479954 | 7/2009 |
| CN | 101692626 | 4/2010 |

OTHER PUBLICATIONS

"Error Control Systems for Digital Communication and Storage" by S. Wicker, Prentice-Hall, 1995, pp. 432-434.*

(Continued)

*Primary Examiner* — Shi K Li
(74) *Attorney, Agent, or Firm* — Dentons US LLP

(57) ABSTRACT

A transmitting device, a receiving device, an optical communication system, and associated methods are provided. The transmitting device transmits an optical signal containing data, and comprises: an optical tone generator for generating at least one optical tone; at least one encoder for performing advanced coding on at least one data signal respectively, each of the at least one data signal carrying a part of the data; at least one mapper for performing high order modulation on the at least one coded data signal; and an up-converter for up-converting the at least one high-order-modulated data signal into the optical signal to be outputted through the at least optical tone. Thereby, high speed (e.g., over 1-Tb/s) transmission per single channel over a long-haul distance (e.g. over 1000-km) with error-free recovery may be achieved.

14 Claims, 13 Drawing Sheets

(56) References Cited

U.S. PATENT DOCUMENTS

| | | | |
|---|---|---|---|
| 2008/0163025 A1 | 7/2008 | Djordjevic et al. | |
| 2008/0294968 A1* | 11/2008 | Djordjevic et al. | 714/801 |
| 2009/0125780 A1 | 5/2009 | Taylor et al. | |
| 2009/0175160 A1 | 7/2009 | Iraji et al. | |
| 2009/0199062 A1* | 8/2009 | Shen et al. | 714/748 |
| 2009/0297144 A1 | 12/2009 | Djordevic et al. | |
| 2010/0046587 A1 | 2/2010 | Wu et al. | |
| 2010/0118992 A1 | 5/2010 | Terabe | |
| 2010/0120467 A1 | 5/2010 | Auranen et al. | |
| 2010/0178057 A1* | 7/2010 | Shieh | 398/79 |
| 2010/0329683 A1 | 12/2010 | Liu | |
| 2011/0069975 A1* | 3/2011 | Liu et al. | 398/202 |
| 2011/0170873 A1* | 7/2011 | Liu et al. | 398/82 |
| 2012/0063533 A1 | 3/2012 | Fonseka et al. | |
| 2012/0257896 A1* | 10/2012 | Djordjevic et al. | 398/65 |

OTHER PUBLICATIONS

Q. Yang et al., "107 Gb/s Coherent Optical OFDM Reception Using Orthogonal Band Multiplexing", Optical Society of America, OFC/NFOEC 2008.
Q. Yang et al., "Real-time Coherent Optical OFDM Receiver at 2.5-GS/s for Receiving a 54-Gb/s Multi-band Signal", Optical Society of America, OSA/OFC/NFOEC 2009.
Q. Yang et al., "Towards Real-Time Implementation of Optical OFDM Transmission, Optical Society of America", OSA/OFC/NFOEC 2010.
Q. Yang et al., "Experimental Demonstration and Numerical Simulation of 107-Gb/s High Spectral Efficiency Coherent Optical OFDM", Journal of Lightwave Technology, pp. 168-176, vol. 27, No. 3, Feb. 1, 2009.
Q. Yang et al., "Real-time Reception of Multi-gigabit Coherent Optical OFDM Signals", Optical Society of America, Optics Express, pp. 7985-7992, vol. 17, No. 10, May 11, 2009.
Q. Yang et al., "Demonstration of Frequency-Domain Averaging Based Channel Estimation for 40-Gb/s CO-OFDM with High PMD", Optical Society of America, OSA/OFC/NFOEC 2009.
Q. Yang et al., "Demonstration of Frequency-Domain Averaging Based Channel Estimation for 40-Gb/s CO-OFDM with High PMD", IEEE Photonics Technology Letters, pp. 1544-1546, vol. 21, No. 20, Oct. 15, 2009.
Q. Yang et al., "1 Tbit/s Single-channel Coherent Optical OFDM Transmission with Trellis-coded Modulation", Electronics Letters, vol. 45, No. 20, Sep. 24, 2009.
Q. Yang et al., "1-Tb/s Single-channel Coherent Optical OFDM Transmission with Trellis-coded Modulation", 2009.
Q. Yang et al., "Guard-band Influence on Orthogonal-band-multiplexed Coherent Optical OFDM", Optics Letters, pp. 2239-2241, vol. 33, No. 19, Oct. 1, 2008.
Q. Yang et al., "Bit and Power Loading for Coherent Optical OFDM", IEEE Photonics Technology Letters, pp. 1305-1307, vol. 20, No. 15, Aug. 1, 2008.
W. Shieh et al., "107 Gb/s Coherent Optical OFDM Transmission over 1000-km SSMF Fiber using Orthogonal Band Multiplexing", Optics Express, pp. 6378-6386, vol. 16, No. 9, Apr. 28, 2008.
W. Shieh et al., "Coherent Optical OFDM: Has its Time Come? [Invited] (Journal of Optical Networking", pp. 234-255, vol. 7, No. 3, Mar. 2008).
W. Shieh et al., "Transmission Channel Rate for Coherent Optical OFDM—Is the Sky the Limit?", pp. 721-722, 2009.
X. Liu et al., "Transmission of 44-Gb/s Coherent Optical OFDM Signal with Trellis-Coded 32-QAM Subcarrier Modulation", Optical Society of America, OSA/OFC/NFOEC 2010.
N. Kaneda et al., "Real-Time 2.5GS/s Coherent Optical Receiver for 53.3-Gb/s Sub-banded OFDM", Journal of Lightwave Technology, pp. 494-501, vol. 28, No. 4, Feb. 15, 2010).
N. Kaneda et al., "Realizing Real-Time Implementation of Coherent Optical OFDM Receiver with FPGAs", ECOC 2009, Sep. 20-24, 2009, Vienna, Austria.
Y. Ma et al., "1-Tb/s per Channel Coherent Optical OFDM Transmission with Subwavelength Bandwidth Access", Optical Society of America, OSA/OFC/NFOEC 2009.
Y. Ma et al., "1-Tb/s Single-Channel Coherent Optical OFDM Transmission with Orthogonal-Band Multiplexing and Subwavelength Bandwidth Access, Journal of Lightwave Technology", pp. 308-315, vol. 28, No. 4, Feb. 15, 2010.
Y. Ma et al., "1-Tb/s Single-channel Coherent Optical OFDM Transmission over 600-km SSMF Fiber with Subwavelength Bandwidth Access, Optics Express", pp. 9421-9427, vol. 17, No. 11, May 25, 2009.
Y. Ma, "Bandwidth-Efficient 21.4 Gb/s Coherent Optical 2x2 MIMO OFDM Transmission", Optical Society of America, OFC/NFOEC 2008.
Z. Tong et al., "21.4 Gb/s Coherent Optical OFDM Transmission over 200 km Multimode Fiber", Electronics Letters 2008, 44-23 1373-U53 SCI375YR.
S. Chen et al., "Multi-gigabit Real-Time Coherent Optical OFDM Receiver", Optical Society of America, OSA/OFC/NFOEC 2009.
S. Chen et al., "Real-Time Multi-Gigabit Receiver for Coherent Optical MIMO-OFDM Signals", Journal of Lightwave Technology, pp. 3699-3704, vol. 27, No. 16, Aug. 15, 2009.
Q. Yang et al., "428-Gb/s Single-channel Coherent Optical OFDM Transmission over 960-km SSMF with Constellation Expansion and LDPC Coding", Optics Express, pp. 16883-16889, vol. 18, No. 16, Aug. 2, 2010.
Chinese Patent Application No. 201110378977.3, Chinese Patent Office, Third Office Action mailed on Aug. 25, 2014; 9 pages.
English Text of Third Office Action for Chinese Patent Application No. 201110378977.3, Chinese Patent Office, Third Office Action mailed on Aug. 25, 2014; 9 pages.
Chinese Patent Application No. 201110378977.3, Chinese Patent Office, First Office Action mailed Dec. 30, 2013; 12 pages.
English Translation of the First Office Action for Chinese Patent Application No. 201110378977.3, Chinese Patent Office, Office Action mailed Dec. 30, 2013; 11 pages.
Yuan, Jian guo et al. "Study on the SFEC code type based on the LDPC code for optical communication systems," Journal of Optoelectronics Laser, vol. 20, No. 11, Nov. 2009; 4 pages.
English Abstract of Yuan, Jian guo et al. "Study on the SFEC code type based on the LDPC code for optical communication systems," Journal of Optoelectronics Laser, vol. 20, No. 11, Nov. 2009; 1 page.
Chinese Patent Application No. 201110378977.3, Chinese Patent Office, Second Office Action mailed on Jun. 11, 2014; 12 pages.
English Translation of Second Office Action for Chinese Patent Application No. 201110378977.3, Chinese Patent Office, Second Office Action mailed on Jun. 11, 2014; 12 pages.
U.S. Appl. No. 12/959,874 Office Action mailed Oct. 3, 2012; 26 pages.
U.S. Appl. No. 12/959,874 Office Action mailed Jan. 29, 2014; 15 pages.
U.S. Appl. No. 12/959,874 Office Action mailed Jun. 17, 2013; 8 pages.
Chinese Patent Application No. 201110379041.2 Chinese Patent Office, First Office Action mailed Jan. 24, 2014; 18 pages.
English Translation of First Office Action for Chinese Patent Application No. 201110379041.2 Chinese Patent Office, Office Action mailed Jan. 24, 2014; 22 pages.
Yuan, Jiang guo et al. "Study on the SFEC code type based on the LDPC code for optical communication systems," Journal of Optoelectronics Laser, vol. 20, No. 11, Nov. 2009; 4 pages.
Martins, Joao et al., "Performance Comparison of Convolutional and Block Turbo Codes for WLAN Applications," Fourth IEEE International Caracas Conference on Devices, Circuits and Systems, Aruba, Apr. 17-19, 2002; 5 pages.
Mizuochi, Takashi et al., "Forward Error Correction Based on Block Turbo Code with 3-Bit Soft Decision for 10-Gb/s Optical Communication Systems," IEEE Journal of Selected Topics in Quantum Electronics, vol. 10, No. 2, Mar./Apr. 2004; 11 pages.
Chinese Patent Application No. 201110378977.3, Chinese Patent Office, Fourth Office Action mailed on Nov. 3, 2014; 12 pages.

(56) References Cited

OTHER PUBLICATIONS

English Text of Fourth Office Action for Chinese Patent Application No. 201110378977.3, Chinese Patent Office, Fourth Office Action mailed on Nov. 3, 2014; 16 pages.

Chinese Patent Application No. 201110378977.3, Chinese Patent Office, Rejection Decision issued on Mar. 4, 2015; 10 pages.
English Text of Rejection Decision for Chinese Patent Application No. 201110378977.3, Chinese Patent Office, issued on Mar. 4, 2015; 13 pages.

* cited by examiner

| Tone No. | 1 | 2 | 3 | 4 | 5 | 6 | 7 | 8 | 9 | 10 |
|---|---|---|---|---|---|---|---|---|---|---|
| Before decoding | 0.008581 | 0.01501 | 0.007669 | 0.012424 | 0.021313 | 0.017688 | 0.027989 | 0.02204 | 0.014683 | 0.011438 |
| After decoding | 0 | 0 | 0 | 0 | 0 | 0 | 0 | 0 | 0 | 0 |
| Tone No. | 11 | 12 | 13 | 14 | 15 | 16 | 17 | 18 | 19 | 20 |
| Before decoding | 0.047893 | 0.032708 | 0.032622 | 0.040883 | 0.027272 | 0.02665 | 0.043621 | 0.031095 | 0.042189 | 0.047834 |
| After decoding | 0 | 0 | 0 | 0 | 0 | 0 | 0 | 0 | 0 | 0 |
| Tone No. | 21 | 22 | 23 | 24 | 25 | 26 | 27 | 28 | 29 | 30 |
| Before decoding | 0.037133 | 0.041789 | 0.045936 | 0.021438 | 0.03123 | 0.05079 | 0.021485 | 0.049325 | 0.036677 | 0.030241 |
| After decoding | 0 | 0 | 0 | 0 | 0 | 0 | 0 | 8 | 0 | 0 |
| Tone No. | 31 | 32 | 33 | 34 | 35 | 36 | 37 | 38 | 39 | 40 |
| Before decoding | 0.033892 | 0.04336 | 0.05085 | 0.051055 | 0.042259 | 0.034236 | 0.049272 | 0.036124 | 0.025827 | 0.021068 |
| After decoding | 0 | 0 | 0 | 0 | 0 | 0 | 0 | 0 | 0 | 0 |
| Tone No. | 41 | 42 | 43 | 44 | 45 | 46 | 47 | 48 | 49 | 50 |
| Before decoding | 0.024382 | 0.026009 | 0.043631 | 0.032113 | 0.026544 | 0.034997 | 0.053313 | 0.051842 | 0.045552 | 0.058439 |
| After decoding | 0 | 0 | 0 | 0 | 0 | 0 | 0 | 0 | 0 | 0 |

FIG.6

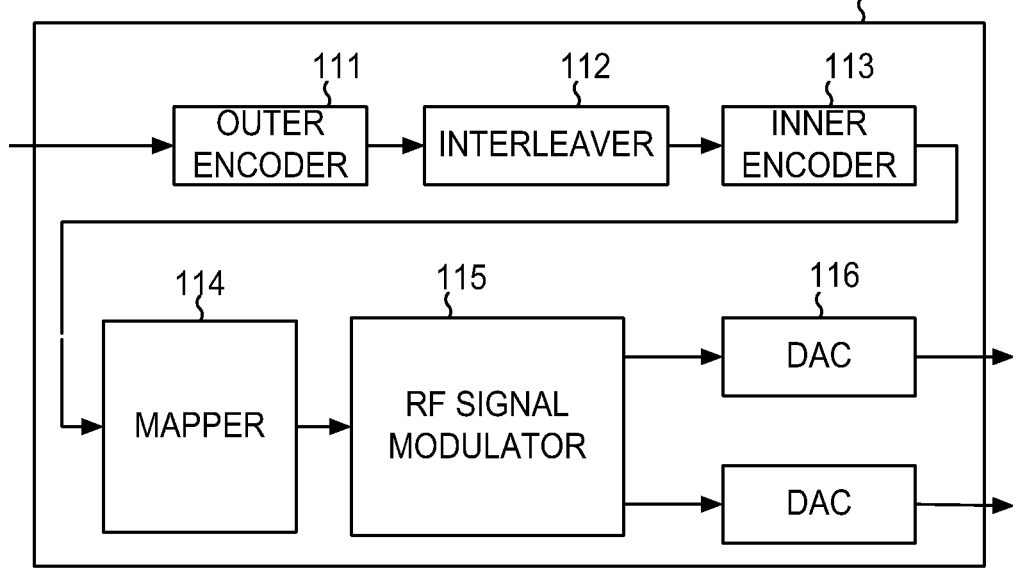
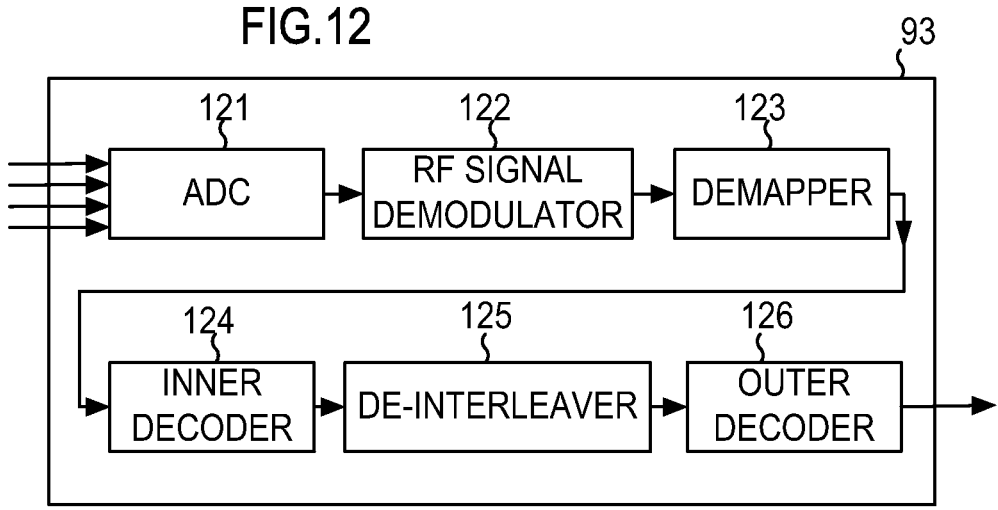

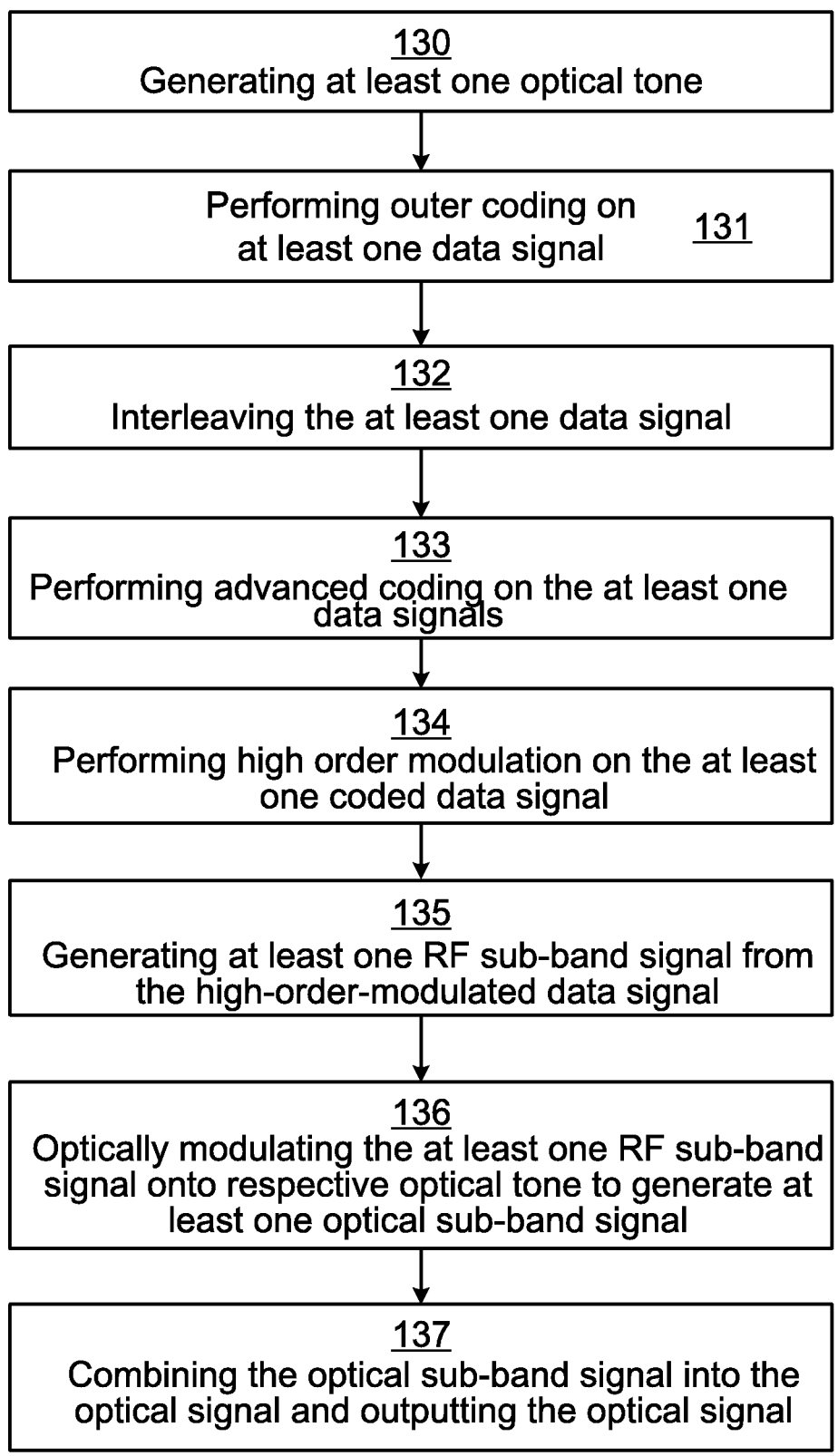

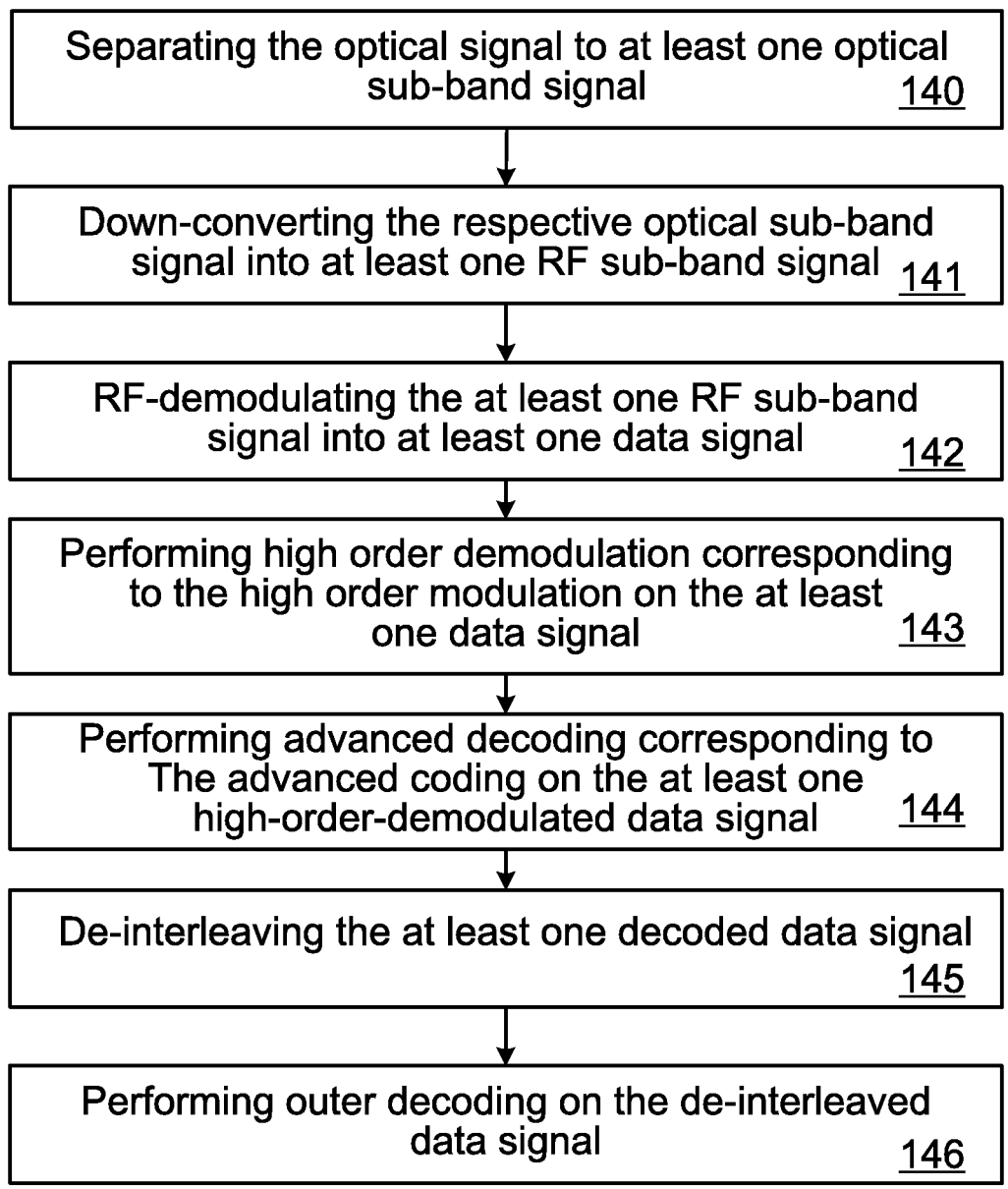

OPTICAL COMMUNICATION SYSTEM, DEVICE AND METHOD EMPLOYING ADVANCED CODING AND HIGH MODULATION ORDER

CROSS REFERENCE TO RELATED APPLICATIONS

This application relates to a concurrently filed, co-pending, and commonly assigned U.S. patent application Ser. No. 12/959,874, entitled "System, Devices and Methods for Subcarrier Recovery at Local Oscillator Frequency in Optical OFDM System" by Qi Yang et al., the disclosure of which is hereby incorporated by reference herein in its entirety.

FIELD OF THE INVENTION

The present invention relates generally to optical communication systems, and more particularly to transmitters and receivers that operate at a high-speed transmission per single channel over a long-haul distance.

DESCRIPTION OF RELATED ART

Research on optical transmission has generally been concentrated on the following four aspects: increase a data rate, increase a transmission reach, increase spectrum efficiency, and improve receiver sensitivity. With fast growing of optical networks, necessity and importance for the above-mentioned four aspects becomes much obvious.

Research groups in recent time have shown over 1-Tb/s signal transmission via a 1000-km (one thousand kilometer) standard single mode fiber (SSMF) using the Wavelength-Division Multiplexing (WDM) technique. For instance, S. L. Jansen in 2008 showed 10×121.9-Gb/s transmission over a 1000-km SSMF. A. Sano showed 30×100-Gb/s all-optical OFDM transmission over a 1300-km SSMF. Although the WDM technique can effectively increase a line rate for optical communication, a fundamental enhancement is increasing the data rate per single channel. In the last decade, a signal with 100-Gb/s per single channel has been widely studied. To keep up with ever-increasing bandwidth demand from the Internet traffic, it is widely believed that 400-Gb/s or 1-Tb/s transport is poised to emerge in the next decade. Several experimental demonstrations have shown a line rate per single wavelength beyond 1-Tb/s. Roman Dischler et al. demonstrated a 1.2-Tb/s per single channel coherent optical OFDM transmission over a 400-km SSMF. And Yiran Ma et al. showed 1-Tb/s per single channel coherent optical OFDM transmission over a 600-km SSMF, which is the longest reach using a SSMF link so far. One of the main limitations is enhanced nonlinearity due to continuous ultra-broad spectrum of a Tb/s signal which results in reach reduction compared to current 100-Gb/s transport. Although in the same year, Xiang Liu and S. Chandrasekhar demonstrated a 1.2-Tb/s over 7200-km transmission, such work is largely supported by Raman amplification and an ultra-large-area fiber. However, existing fiber plants are mainly constructed by SSMF. And the main amplification joints in the existing fiber links are using Erbium doped fiber amplifiers (EDFAs). It is desirable for the emerging Tb/s transport to be compatible with the existing fiber plants. It is, therefore, of high importance to improve sensitivity of a receiving device so that an optical signal can be recovered in the presence of linear optical amplifier noises and fiber nonlinearity.

One key approach to improve the system sensitivity is using high-performance error correction codes (ECC). For instance, Reed-Solomon (RS) codes or BCH codes can be used to correct a noised signal with a bit error ratio (BER) at $\sim 1 \times 10^{-3}$ level. However, a common way to use such kinds of codes introduces some overhead. The increased overhead (lower rate) codes further improve the system performance, but also require higher bandwidth that adversely affect the spectrum efficiency and the system cost. It is thus preferable to improve the system performance using strong FEC codes without extending the signal bandwidth. Another coding scheme, named Trellis-coded modulation (TCM), is using overhead to map a signal onto high order modulation (i.e., perform high order modulation on a signal). By doing so, a distance of a signal constellation is extended. Qi Yang showed a 1-Tb/s TCM coded coherent optical OFDM transmission. That work extended the original transmission with quadrature phase shift keying (M-PSK, M=4) constellation onto 8-PSK (M-PSK, M=8). The optical signal-to-noise ratio (OSNR) achieves 2.6 dB improvements at back-to-back (0-km transmission). However, such kind of code has its limitation that it is very sensitive to phase issue on the constellation, which means the improvement may degrade during the long-haul transmission. Xiang Liu showed a 44-Gb/s trellis-coded 32-QAM CO-OFDM transmission over a 990-km SSMF, which has improvement of 1.2 dB. Compared to the work done by Qi Yang in 2010, which was published in OECC'2010, the same transmission at back-to-back can have 3.4 dB improvement. Although such scheme can be used to improve the system performance, it is not a good choice for long-haul transmission due to its ultra sensitivity to phase noises. To achieve good improvement, the computation complexity of TCM becomes very heavy. Thus, the preferred ECC codes should have a strong coding ability for various transmission cases, and practical computation complexity, which are essential for 1-Tb/s signal to reach an over 1000-km distance.

In a conventional coherent optical transmission with either single carrier scheme or OFDM scheme, QPSK is the most frequently used modulation format, which has several advantages over the others. The spectrum efficiency can achieve more than 3 bit/s/Hz, which is greater than BPSK, conventional binary NRZ format, etc. This modulation format has good receiver sensitivity, while having a low computation complexity. However, to realize more than 1-Tb/s transmission using such modulation format for over 1000-km SSMF reaches, the conventional technique for QPSK modulation appears to be insufficient.

Accordingly, it is desirable to have an optical communication system, device, and method that improve the system sensitivity for one or several Tb/s long-haul transmissions.

SUMMARY OF THE INVENTION

The present invention provides a transmitting device, a receiving device, an optical communication system, and methods, which improve the system sensitivity and achieve a high speed (e.g., over 1-Tb/s) transmission per single channel over a long-haul distance (e.g. over 1000-km).

In one embodiment of the invention, a transmitting device transmits an optical signal containing data, comprising an optical tone generator for generating at least one optical tone; one or more encoders, each encoder performing advanced coding on an associated data signal to generated an associated coded data signal, the associated coded data signal carrying a portion of the data; one or more mappers, each mapper coupled to an associated encoder for receiving the associated coded data signal, each mapper performing high order modulation on the associated coded data signal; and an up-converter, coupled to the one or more mappers, for up-converting the associated high-order-modulated data signal in each mapper into the optical signal to be outputted through the at least one optical tone.

In one embodiment of the invention, there is provided a receiving device for receiving an optical signal containing data subjected to advanced coding and high order modulation, comprising a down-converter for down-converting the optical signal into at least one data signal; at least one demapper for performing high order demodulation corresponding to the high order modulation on the at least one data signal; and at least one decoder for performing advanced decoding corresponding to the advanced coding on the at least one data high-order-demodulated signal to recover the data.

In one embodiment of the invention, there is provided an optical communication system comprising the above transmitting device and the above receiving device.

In one embodiment of the invention, a method is provided for transmitting an optical signal containing data, comprising generating at least one optical tone; performing advanced coding on at least one data signal respectively, each of the at least one data signal carrying a part of the data; performing high order modulation on the at least one coded data signal; and up-converting the at least one high-order-modulated data signal into the optical signal to be outputted through the at least optical tone.

In one embodiment of the invention, a method is provided for receiving an optical signal containing data subjected to advanced coding and high order modulation, comprising: down-converting the optical signal into at least one data signal; performing high order demodulation corresponding to the high order modulation on the at least one data signal; and performing advanced decoding corresponding to the advanced coding on the at least one high-order-demodulated data signal to recover the data.

The transmitting device, the receiving device, the optical communication system, and the methods according to the present invention apply advanced coding, such as the low density parity-check coding (LDPC) or Turbo coding, and high order modulation on data signals to be transmitted, and thereby may achieve high speed (e.g., over 1-Tb/s) transmission per single channel over a long-haul distance (e.g. over 1000-km) with error-free recovery.

The structures and methods of the present invention are disclosed in the detailed description below. This summary does not purport to define the invention. The invention is defined by the claims. These and other embodiments, features, aspects, and advantages of the invention will become better understood with regard to the following description, appended claims and accompanying drawings.

BRIEF DESCRIPTION OF THE DRAWINGS

The present invention is better understood upon consideration of the detailed description below and the accompanying drawings, in which:

FIG. 6 shows a table presenting BER-versus-OSNR performance for 1.08-Tb/s coherent optical OFDM over a 1040-km SSMF transmission under OSNR of 28.7 dB.

FIG. 11 is a block diagram illustrating a sub-band signal generating unit as shown in FIG. 9 in accordance with the present invention.

FIG. 12 is a block diagram illustrating a signal processor shown in FIG. 8 in accordance with the present invention.

FIG. 13 is a flow chart illustrating a method of transmitting an optical signal according to a second embodiment of the invention, FIG. 14 is a flow chart illustrating a method of receiving an optical signal according to a second embodiment of the invention.

DETAILED DESCRIPTION

Figure 1:
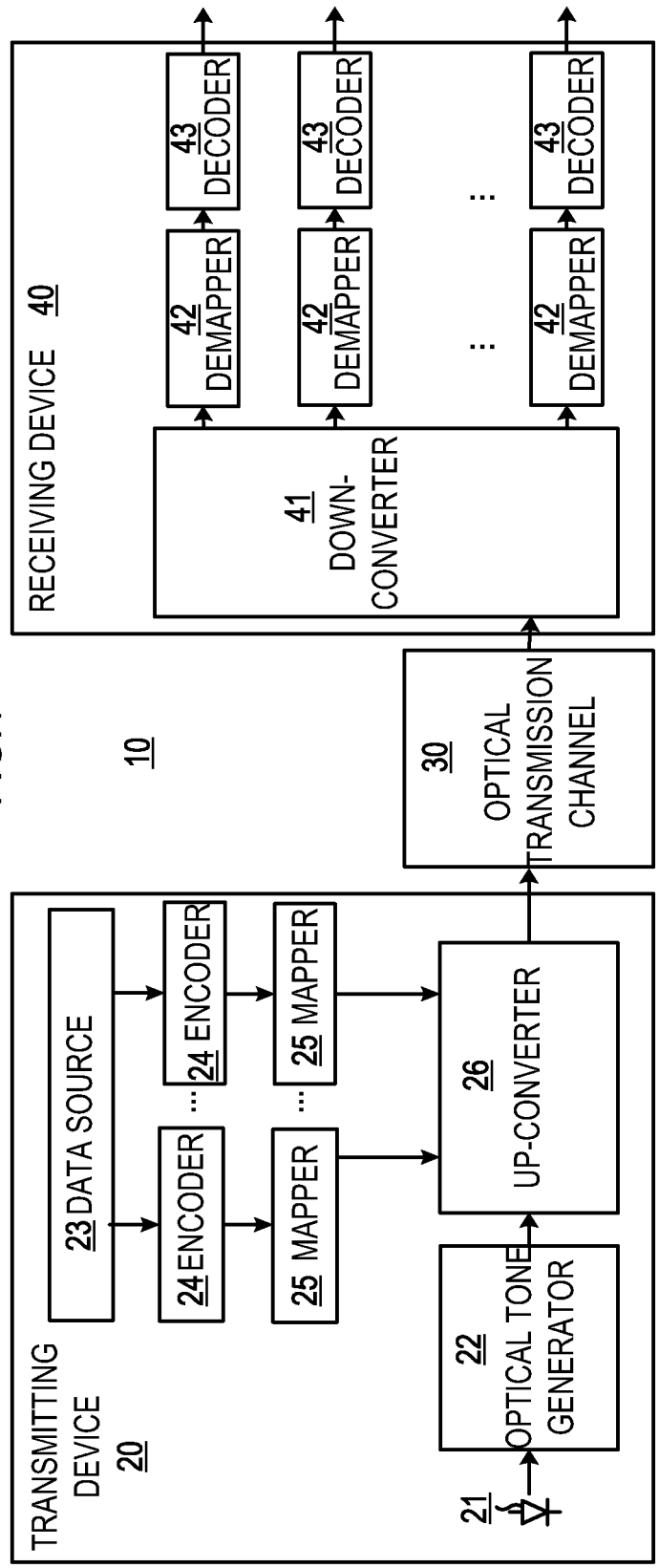
FIG. 1 is a system diagram illustrating the configuration of a high speed long-haul optical communication system in accordance with a first embodiment of the present invention.

A description of structural embodiments and methods of the present invention is provided with reference to FIGS. 1-14. It is to be understood that there is no intention to limit the invention to the specifically disclosed embodiments but that the invention may be practiced using other features, elements, methods and embodiments. Like elements in various embodiments are commonly referred to with like reference numerals. Various exemplary embodiments of the present invention will now be described more fully with reference to the accompanying drawings in which only some exemplary embodiments are shown. Specific structural and functional details disclosed herein are merely representative for purposes of describing exemplary embodiments. The present invention, however, may be embodied in many alternate forms and should not be construed as limited to only the exemplary embodiments set forth herein.

Figure 2A:
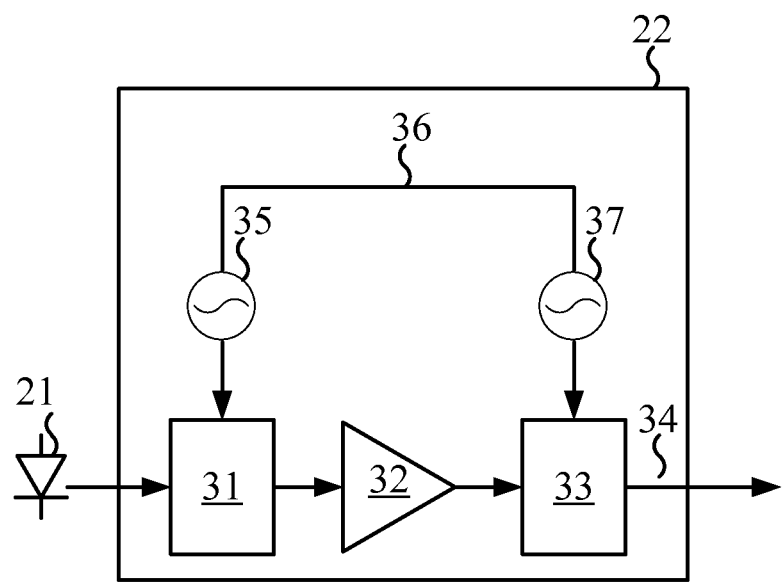
FIG. 2A is a block diagram illustrating an optical tone generator as shown in FIG. 1 in accordance with the present invention.
Figure 2B:
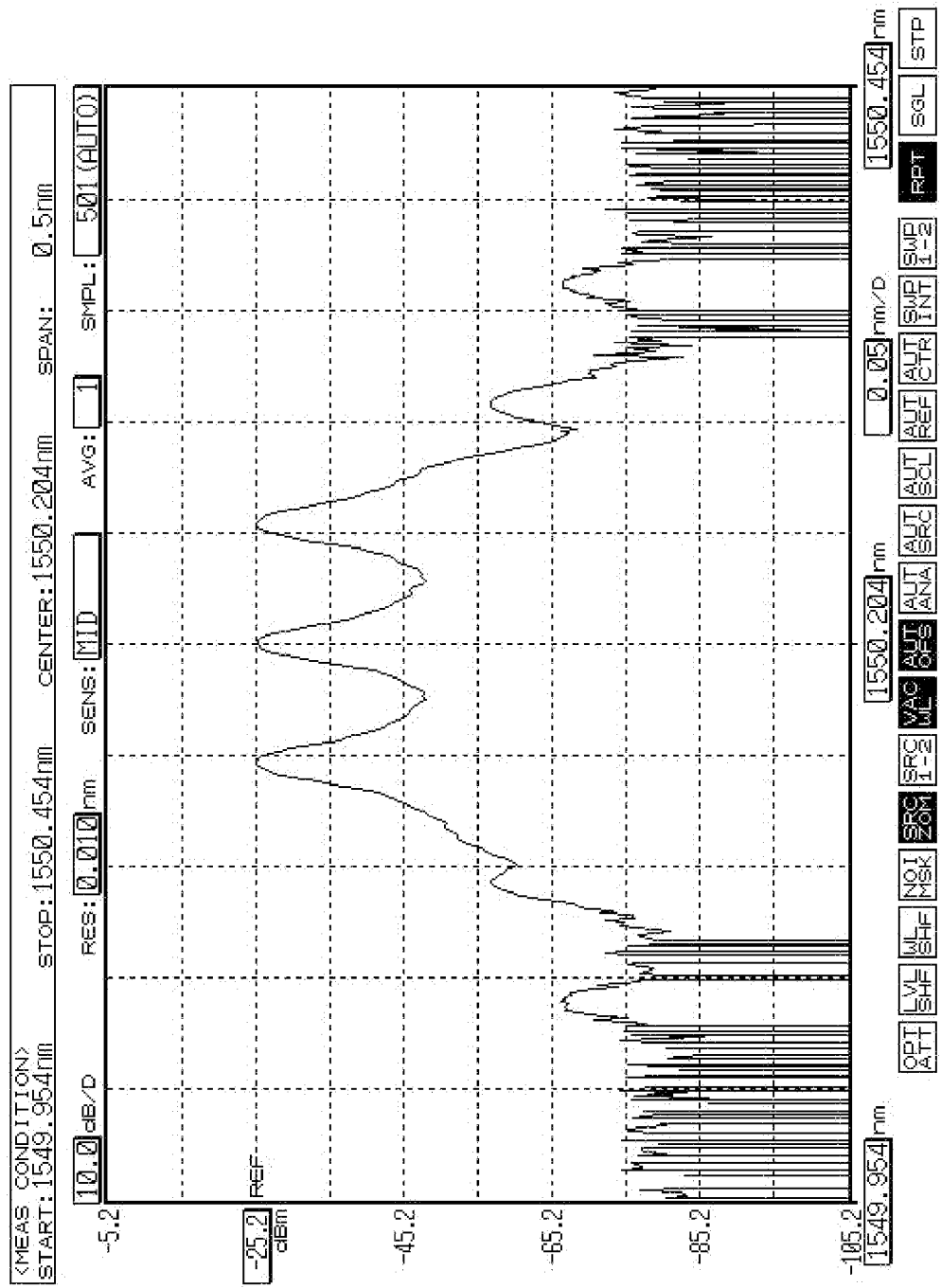
FIG. 2B illustrates three optical tones generated by applying one optical tone generating unit in the optical tone generator in accordance with the present invention.
Figure 2C:
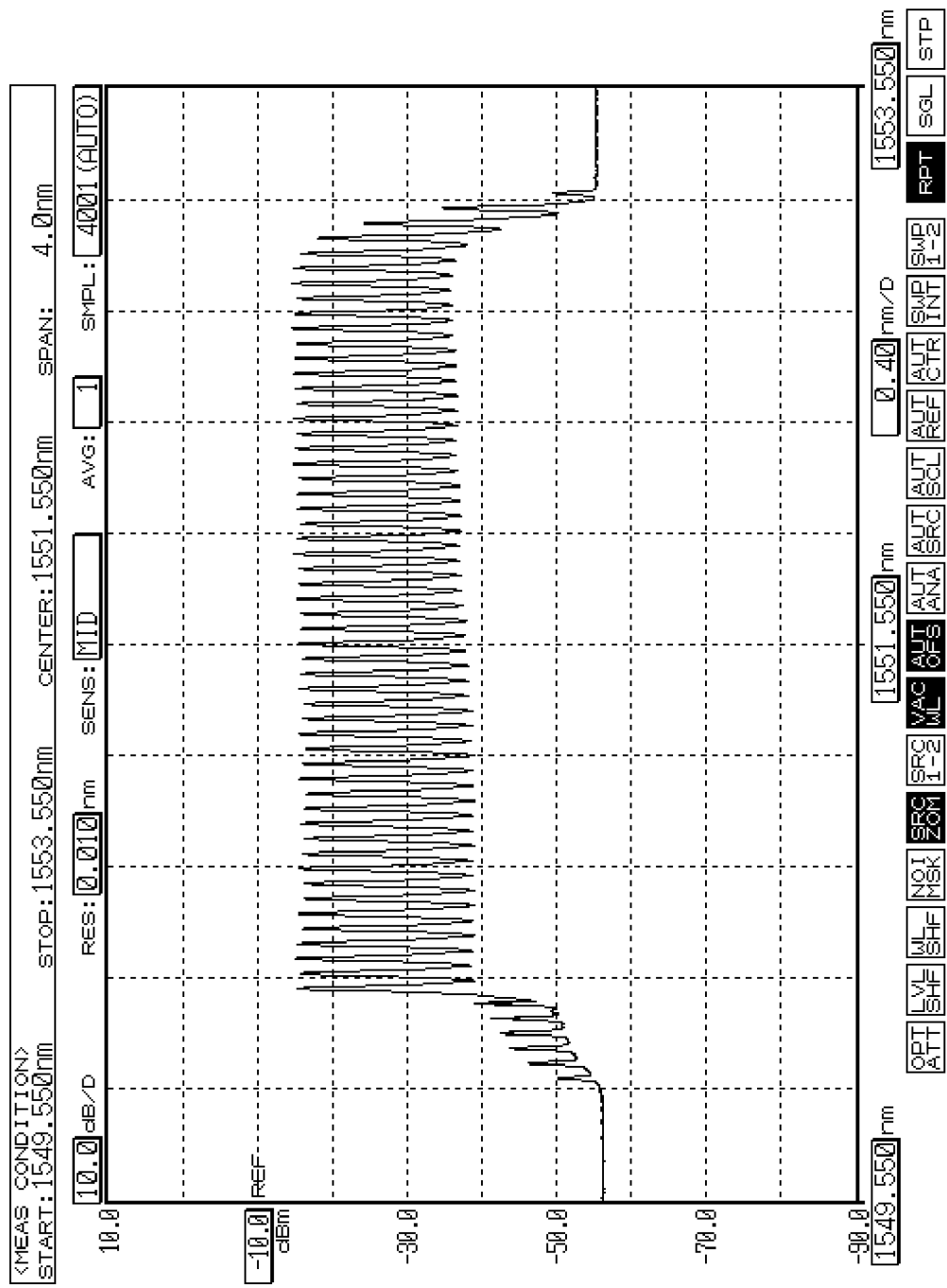
FIG. 2C illustrates multiple optical tones generated by applying two cascaded optical tone generating units in the optical tone generator in accordance with the present invention.
Figure 3:
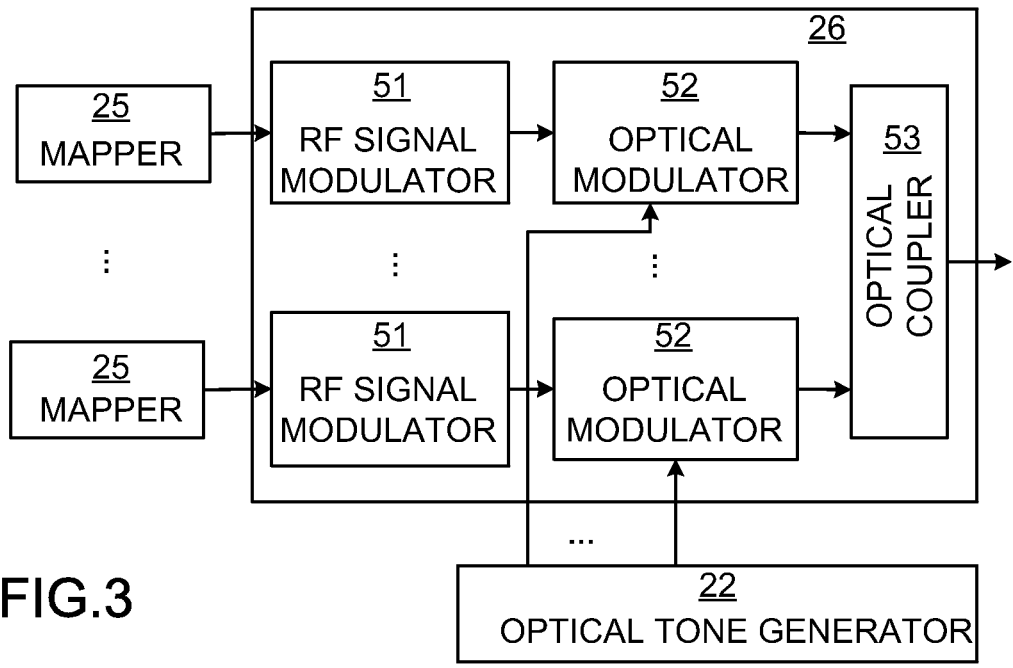
FIG. 3 is a block diagram illustrating the up-converter as shown in FIG. 1 in accordance with the present invention.

An optical communication system, a transmitting device, and a receiving device according to a first embodiment of the invention are described in detail with reference to FIGS. 1-3.

Referring now to FIG. 1, there is shown a system configuration of a high speed (e.g. over 1-Tb/s) long-haul (e.g., over 1000-km) optical transmission system 10 according to a first embodiment of the present invention. The optical communication system 10 includes a transmitter (also referred to as a transmission device, or a transmitting device) 20, an optical transmission channel 30, and a receiver (also referred to as a receiving device) 40. The transmitter 20 is coupled to the optical transmission channel 30. The optical transmission channel 30 in turn is coupled to the receiver 40.

The transmitter 20 transmits an optical signal containing data to the receiver 40 via the optical transmission channel 30.

The transmitter 20 includes an optical source 21, an optical tone generator 22, a data source 23, one or more ($N_t$) encoders 24, $N_t$ mappers 25, and an up-converter 26, where $N_t \geq 1$. The optical source 21 can originate from various sources, such as a single laser source, which generates a single continuous-wave (CW) optical carrier at a predetermined wavelength. The optical tone generator 22 receives a single optical carrier generated by the optical source 21. The optical tone generator 22 generates $N_t$ optical tones from the single optical carrier and sends the $N_t$ optical tones to the up-converter 26. The up-converter 26, which is described in detail with respect to FIG. 3, includes $N_t$ optical modulators where each optical modulator receives a respective optical tone from the optical tone generator 22. The generated tones refer to optical carriers at different wavelengths. An example of the optical tone generator is shown in FIG. 2. For example, a single laser source generates 50 tones, and each tone is used to carry a 21.6-Gb/s signal, which collectively yields a final net rate of 1.08-Tb/s.

The data source 23 is a source which provides the data (e.g., data bits) to be transmitted in a form of data signals. The date source 23 may be any type of data source commonly known in the art. The data source 23 provides $N_t$ data signals to the respective encoders 24. Specifically, the data (bits) to be transmitted are divided into $N_t$ parts, so that each part of the data is carried by one data signal, and the $N_t$ data signals carry all the data (bits) to be transmitted. In the 1.08-Tb/s example, the $N_t$ is 50.

The $N_t$ encoders 24 perform advanced coding on the $N_t$ data signals, respectively, and then provide the coded data signals to corresponding mappers. Preferably, the advanced coding used here may be coding with a net coding gain above 5 dB at BER=$10^{-13}$ compared to BER-versus-OSNR performance of un-coded transmission, and may have a low coding rate, for example, a net coding rate between 20%-85%. The encoders 24 may encode the data signals by using a strong error correction coding (ECC) scheme, such as low-density parity-check coding scheme. Another example of the advanced coding is Turbo coding scheme. It is to be noted that, the advanced coding scheme is not limited to the low-density parity-check coding scheme and the Turbo coding scheme, and other advanced error correction coding scheme currently known or developed in the future may also be employed as the advanced coding scheme. In the 1.08-Tb/s example, the used ECC scheme is LDPC coding scheme with a code rate of 50%, and the code size is (15120, 7560).

The $N_t$ mappers 25 map the $N_t$ coded data signals onto high order modulation, i.e. perform high order modulation on the $N_t$ coded data signals, respectively. For example, the mappers 25 may employ M-PSK or M-QAM modulation, where M is a modulation order equal to or larger than 4 ($M \geq 4$) as the high order modulation. By doing so, even if the ECC coding rate at the encoders 24 is low, the spectrum efficiency of the optical communication system 10 maintains at least a conventional level (e.g., the spectrum efficiency may be greater than 2.5 bit/s/Hz). In the 1.08-Tb/s example, the constellation is using 16-QAM, where M is equal to 16. When a 50%-rate LDPC code rate is employed, the finial net rate or spectrum efficiency of a system according to the embodiment of the invention is the same as transmitting a QSPK signal (M=4). It is to be noted that, the high order modulation scheme is not limited to M-PSK or M-QAM modulation schemes, and other high order modulation schemes currently known or developed in the future may also be employed here.

The up-converter 26 up-converts the $N_t$ high-order-modulated data signals into the optical signal, which contains all the data to be transmitted, so that the optical signal is transmitted to the receiver 40.

Next, the optical tone generator 22 will be described in detail. FIG. 2A is a block diagram showing the optical tone generator 22 illustrated in FIG. 1. As shown in FIG. 2A, the optical tone generator 22 comprises a first optical tone generating unit 31, and a second optical tone generating unit 33 cascaded with the first optical tone generating unit 31. An EDFA 32 is preferably arranged between the two optical tone generating units 31, 33 to amplify the optical tones generated by the first optical tone generating unit 31 and then feed the amplified optical tones to the second optical tone generating unit 33.

The first optical tone generating unit 31 generates multiple tones from the continuous-wave (CW) optical carrier generated by the optical source 21. Spacing of the generated optical tones, i.e. a frequency reference of the first optical tone generating unit 31, may be provided by a first clock source 35, which may be a radio frequency (RF) frequency synthesizer. For example, some optical components or devices in the first optical tone generating unit 31 may be fine tuned to produce the multiple tones at different wavelengths from the single laser source. The first optical tone generating unit 31 may be an optical intensity modulator, and by performing certain adjustments on its bias voltage and input RF power of the optical intensity modulator, the first optical tone generating unit 31 may generate, for example, three optical tones with an even power level, as shown in FIG. 2B, in which case the tone spacing is 6.71875-GHz. The second optical tone generating unit 33 generates more (e.g. $N_t$) optical tones from the inputted optical tones. The second optical tone generating unit 33 may be a re-circulating frequency shifter (RFS), which includes an optical I/Q modulator, an EDFA, etc., as disclosed in Yiran Ma's post-deadline work in OFC'2009. Similar to the first optical tone generating unit, a frequency reference of the second optical tone generating unit 33 may be provided by a second clock source 37. A common clock reference 36 is used to lock the two clock sources, so as to lock frequency stability for the clock sources. By applying the two cascaded optical tone generating units, a large number of optical tones may be effectively generated from a single laser source. In the 1.08-Tb/s example, the RFS tone generation unit 33 produces more than 17 optical tones individually if only one laser source is inputted, and the tone spacing is driven at 20.15625-GHz. When the three tones generated from the first optical tone generating unit are inputted, the RFS tone generation unit 33 can produce 51 (=3×17) tones. By tuning bandwidth and center wavelength of an optical filter in the optical tone generating unit, 50 optical tones with a signal-to-noise ratio more than 20 dB can be generated, which is shown in FIG. 2C. It is to be noted that, although an example of two optical tone generating units in the optical tone generator 22 is given above, the number of optical tone generating units is not limited to 2, and may be changed according to different requirements on optical tones and/or other factors. Specifically, only one optical tone generating unit may be used in the optical tone generator 22 to generate multiple optical tones. Alternatively, three or more optical tone generating units may be incorporated in the optical tone generator 22 to generate the optical tones. Additionally, the number of the generated optical tones may be one, and the types of the respective optical tone generating units are not limited to the intensity modulator or the RFS, and may be other types commonly known in the art. Accordingly, the configuration of the optical tone generator 22 may vary depending on different requirements of the optical tones and different generating methods.

Next, the up-converter 16 will be described with reference to FIG. 3. As shown in FIG. 3, the up-converter 26 includes $N_t$ RF signal modulators 51 and associated $N_t$ optical modulators 52, and an optical coupler 53.

The $N_t$ RF signal modulators 51 receive the $N_t$ high-order-modulated data signals, and RF-modulate (or convert) the $N_t$ high-order-modulated data signals into $N_t$ RF sub-band signals (in the electrical domain), respectively. Each of the RF sub-band signals occupies a part of band (a sub-band) of the whole band that the transmission of the data may occupy. In the embodiment, the RF sub-band signals may be single-carrier signals or orthogonal frequency division multiplexing (OFDM) signals. The manner of RF-modulating the $N_t$ high-order-modulated data signals is commonly known in the art, and thus will not be described in detail here.

The optical modulators 52 optically modulate the $N_t$ RF sub-band signals onto corresponding optical tones provided from the optical tone generator 22, respectively, so as to generate $N_t$ optical sub-band signals (in the optical domain), and provide the optical sub-band signals into the optical coupler 53.

The optical coupler 53 combines the $N_t$ optical sub-band signals into an optical signal which occupies the whole band and contains all the data to be transmitted, and then outputs the optical signal, so as to transmit it via the optical transmission channel 30.

The optical transmission channel 30 may be a fiber link formed by a standard single mode fiber (SSMF) with a length of for example 1000-km. One or more Erbium doped fiber amplifiers (EDFAs) (not shown in the figure) may be provided in the optical transmission channel 20 when necessary to amplify the transmitted optical signal so as to compensate the fiber loss during the transmission. In the 1.08-Tb/s example, the fiber link is emulated with a fiber loop with 80-km per span, which is a common experimental configuration; the 1040-km is emulated and controlled by a timer and two optical on/off switches; and one EDFA is placed in the loop to compensate the loss of each span.

The receiver 40 receives the optical signal transmitted from the transmitter 20, and recovers the data from the optical signal. As shown in FIG. 1, the receiver 40 comprises a down-converter 41, at least one ($N_r$) demappers 42, and $N_r$ decoders 43, where $N_r \geq 1$, and $N_r$ may be the same as or different from $N_t$.

The down-converter 41 down-converts the optical signal into $N_r$ data signals. Each of the data signals contains a part of data transmitted at the transmitting device. The down-converter 31 will be described in detail later.

Each of the $N_r$ demappers 42 performs high order demodulation, which corresponds to the high order modulation performed at the transmitter 20, on respective one of the $N_r$ data signals. For example, when the transmitter 20 performs one of M-ray phase shift keying and M-ray quadrature amplitude modulation (M≥4), the demapper 42 performs corresponding demodulation according to the modulation order M. Additionally, the output of the demapper 42 determines the decision scheme used in the decoder 43. Specifically, if the demapper 42 outputs binary data bits, then a hard-decision scheme is used in the decoder 43. If likelihood for the binary data bits is outputted, then the decoder 43 will use a soft-decision scheme, which has further improvement compared to the hard-decision scheme. In the 1.08-Tb/s example, when the 16-QAM signal is demapped, the likelihoods of the decision are fed into the advanced decoder.

Subsequently, each of the $N_r$ decoders 43 performs advanced decoding, which corresponds to the advanced coding performed at the transmitter 20, on respective one of the high-order-demodulated data signals outputted from the corresponding demapper 42, so as to recover the data contained therein. Specifically, the decoder 43 decodes the data signal using a decoding scheme having the same rate and type as those of the coding scheme used in the transmitter. For instance, if the LDPC coding scheme is used in the transmitter, the decoder 43 performs the decoding by using several corresponding LDPC decoding algorithms, such as a log-domain sum-product algorithm, with the same coding rate. The outputs from the respective decoders 43 are the recovered data. BER is calculated by comparing such data with originally transmitted data in the transmitter 20. In the 1.08-Tb/s example, the LDPC decoder is using log-domain sum-product algorithms.

Next, the down-converter 41 will be described with reference to FIG. 4.

Figure 4:
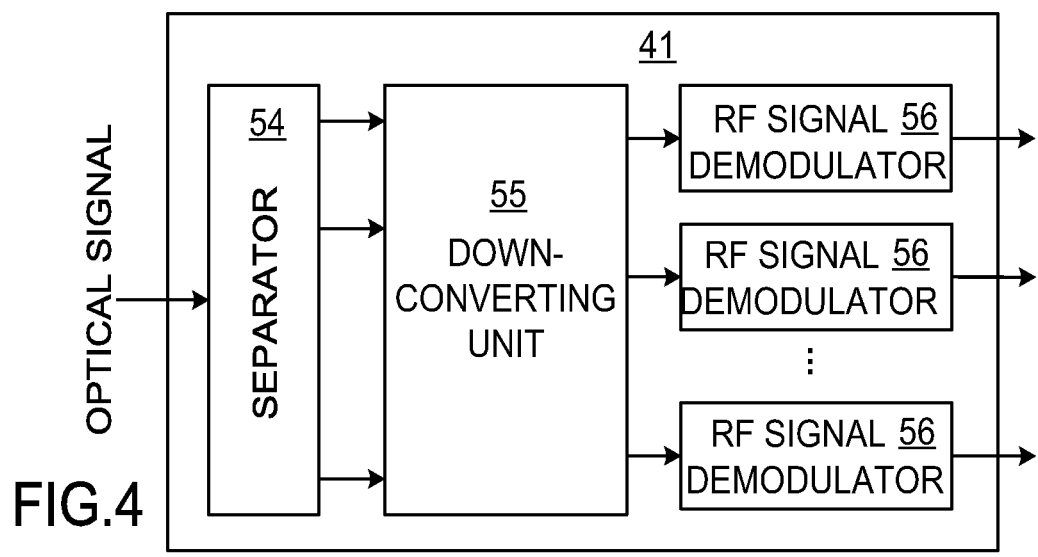
FIG. 4 is a block diagram illustrating the down-converter shown in FIG. 1 in accordance with the present invention.

As shown in FIG. 4, the down-converter 41 comprises a separator 54, a down-converting unit 55, and $N_r$ RF signal demodulators 56.

The separator 54 separates the optical signal which occupies the whole band into $N_r$ optical sub-band signals, each of which occupies a part of the whole band, and provides the $N_r$ optical sub-band signals to the down-converting unit 55, respectively. For example, the optical sub-band separator 54 may use $N_r$ band-pass filters to separate the optical signal, each band-pass filter selecting and outputting one optical sub-band signal.

The down-converting unit 55 down-converts the respective optical sub-band signals into $N_r$ RF sub-band signals, which will be described later, and provides the $N_r$ RF sub-band signals to corresponding RF signal demodulators 56.

The RF signal demodulators 56 RF-demodulate (or convert) the $N_r$ RF sub-band signals provided from the down-converting unit 55 into $N_r$ data signals, and provide the data signals to the downstream demapper 42.

Figure 5:
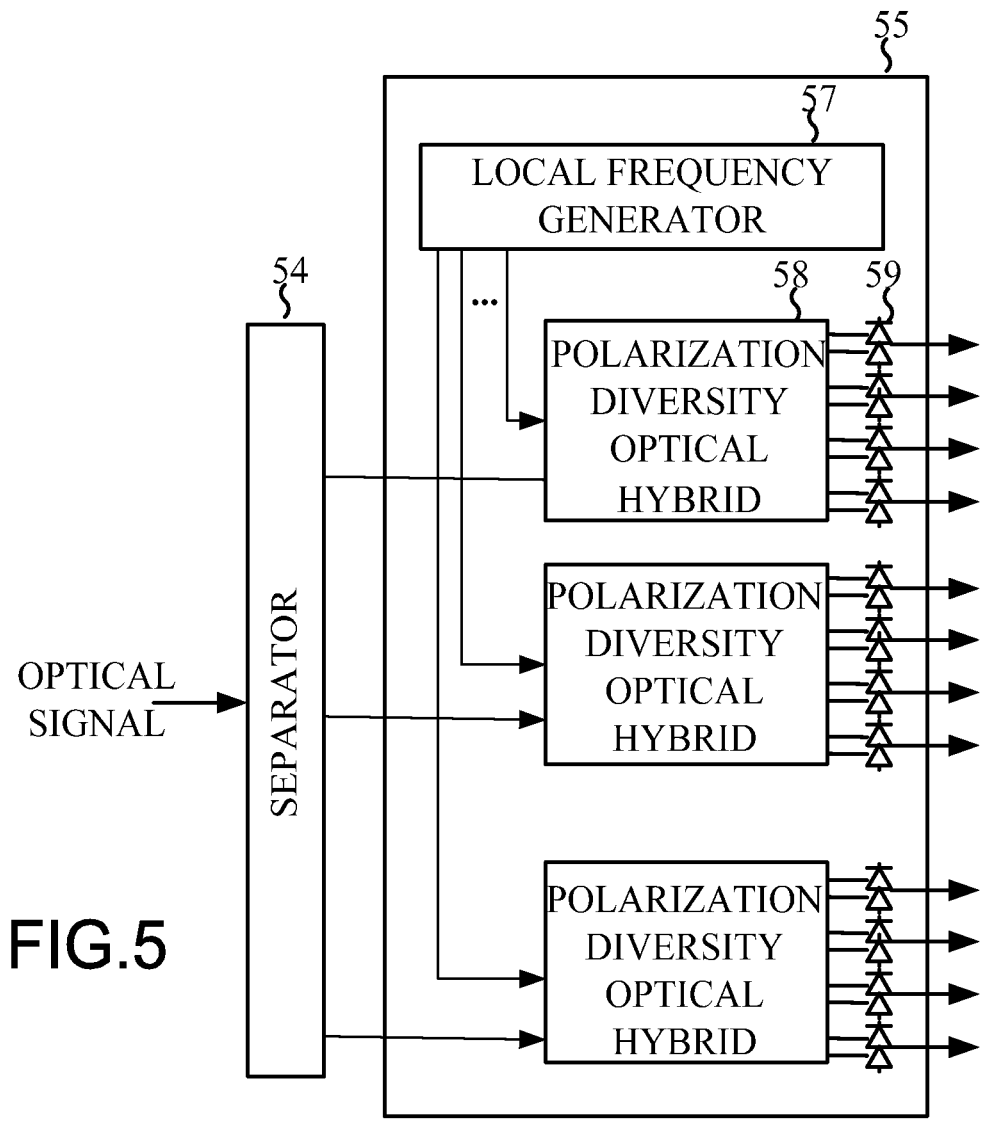
FIG. 5 is a more detailed block diagram illustrating a down-converting unit as shown in FIG. 4 in accordance with the present invention.

In the following, the down-converting unit 55 will be described with reference to FIG. 5. As shown in FIG. 5, the down-converting unit 55 includes a local frequency generator 57, and at least one group of a polarization diversity optical hybrid 58 and optical photo-diodes 59.

The optical sub-band signals outputted from the separator 55 are inputted to the respective polarization diversity optical hybrids 58, as shown in FIG. 5. The local frequency generator 57 generates $N_r$ local oscillating signals at $N_r$ frequencies, each of which is tuned close to a center of a sub-band of the optical sub-band signal inputted into the corresponding polarization diversity optical hybrid 58, and provides the local oscillating signals to the respective polarization diversity optical hybrids 58. The local frequency generator 58 may generate the local oscillating signals in various manners. For example, the local frequency generator may contain $N_r$ laser sources, each of which generates one local oscillating signal at one of the $N_r$ frequencies. The local frequency generator 57 may also use a structure similar to the multiple-tone generation structure described in FIG. 2 followed by a tone separator for separating the tones. Alternatively, the local frequency generator 57 may use a combination of the multiple-tone generation structure and one or more laser sources to generate the local oscillating signals. If laser sources are used in the local frequency generator 57, the number of the laser sources is not necessary to be one, and may be more than one. Additionally, although only one local frequency generator which generates $N_r$ local oscillating signals is shown in FIG. 5, this is only illustrative, and instead, one or more local frequency generators may be used to generate the $N_r$ local oscillating signals. In other words, any unit that can generate the multiple local oscillating signals can be used as one embodiment.

Each of the oscillating signals beats with the optical sub-band signal in the corresponding polarization diversity optical hybrid 58, and then is detected by for example four pairs of balanced photo-diodes 59 in a coherent heterodyne fashion, so that each optical sub-band signal is converted into a RF sub-band signal. The particular manner for converting each optical sub-band signal into the RF sub-band signal by the local frequency generator, the polarization diversity optical hybrid, and the photo-diodes is well known in the art, thus detailed descriptions thereof are omitted here for simplicity. Additionally, the down-converting unit 56 may convert the optical sub-band signal in other manners, besides the one shown in FIG. 5.

In the above embodiment, by applying both the advanced coding and the high order modulation on the data signals, the sensitivity of the optical communication system is improved, thus a high speed long-haul optical transmission may be achieved. For example, it has been proved experimentally that a 1.08-Tb/s optical error-free transmission per single channel over a 1040-km SSMF fiber may be realized. FIG. 6 shows a table presenting the BER performance for 1.08-Tb/s coherent optical OFDM over a 1040-km SSMF transmission under OSNR of 28.7 dB. It can be seen from this table that before decoding, the BER presents a very high error level, whereas after LDPC decoding, all the 50 tones can be fully recovered with no error.

Hereinafter, an optical communication method, a method for transmitting an optical signal, and a method for receiving an optical signal according to a first embodiment of the invention will be described.

In the optical communication method according to the first embodiment of the invention, the transmitter 20 transmits an optical signal containing data via an optical transmission channel, and then the receiver 40 receives the optical signal and recovers the data.

Figure 7:
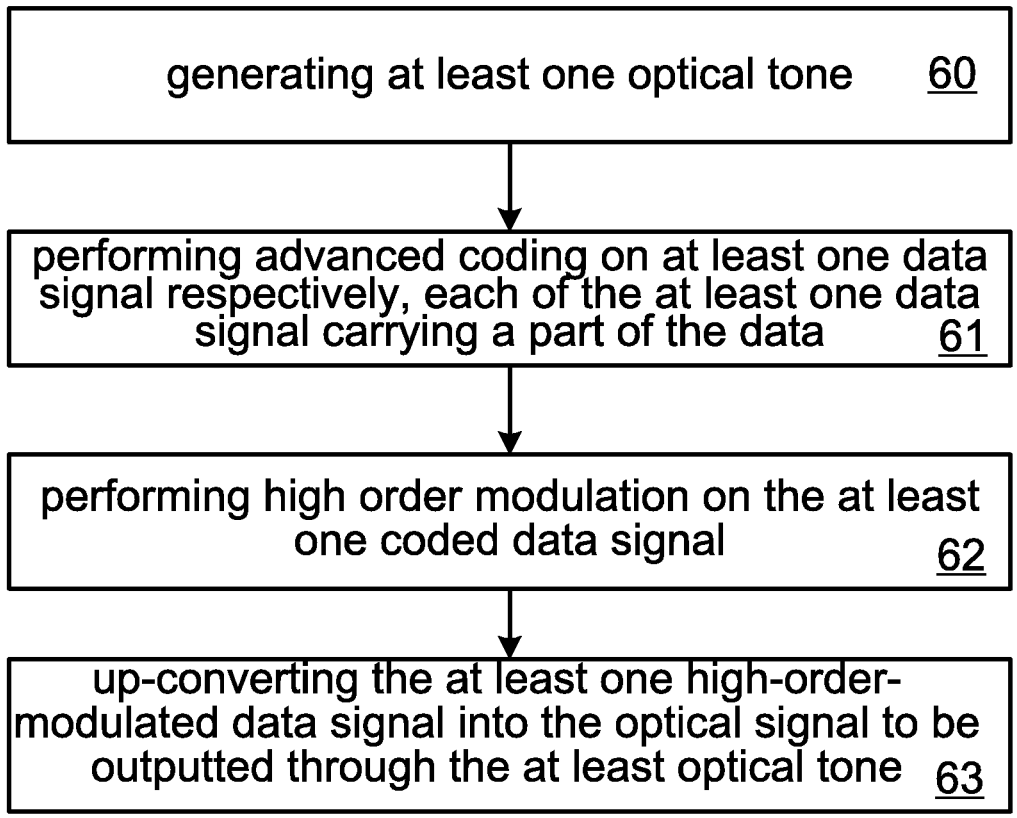
FIG. 7 is a flow chart illustrating a method of transmitting an optical signal according to a first embodiment of the invention.

FIG. 7 shows a flow chart of the method of transmitting the optical signal according to the first embodiment of the invention, which may be used in the transmitter 20.

As shown in FIG. 7, in step 60, $N_t$ optical tones are generated. The $N_r$ optical tones may be generated by at least one optical tone generating unit from a single laser source, as shown in FIG. 2.

In step 61, advanced coding is performed on $N_t$ data signals respectively, each of the $N_t$ data signals carrying a part of the data to be transmitted. The $N_t$ data signals are the same as those described with reference to FIG. 1. The advanced coding is preferably coding with a net coding gain above 5 dB at BER=$10^{-13}$ compared to BER-versus-OSNR performance of un-coded transmission, and may have a net coding rate between 20%-85%. Examples of the advanced coding are low density parity-check coding or Turbo coding. It is to be noted that, the advanced coding scheme is not limited to the low-density parity-check coding scheme and the Turbo coding scheme, and other advanced error correction coding scheme currently known or developed in the future may also be employed as the advanced coding scheme.

In step 62, high order modulation is performed on the $N_t$ coded data signals. The high order modulation performed here may be one of M-ray phase shift keying and M-ray quadrature amplitude modulation, M≥4. Other high order modulation scheme currently known or developed in the future are also applicable.

In step 63, the $N_t$ high-order-modulated data signals are up-converted into the optical signal to be outputted through the at least optical tone generated in step 60. Specifically, the $N_t$ high-order-modulated data signals are RF-modulated into $N_t$ RF sub-band signals, which may be single-carrier signals or OFDM signals as described above; then the $N_t$ RF sub-band signals are optically modulated onto the respective optical tones generated in step 60 to generate $N_t$ optical sub-band signals; finally, the $N_t$ optical sub-band signals are combined into the optical signal, so that the optical signal is outputted.

The method of receiving the optical signal according to the first embodiment of the invention, which may be used in the receiver 40, will be described with reference to FIG. 8.

Figure 8:
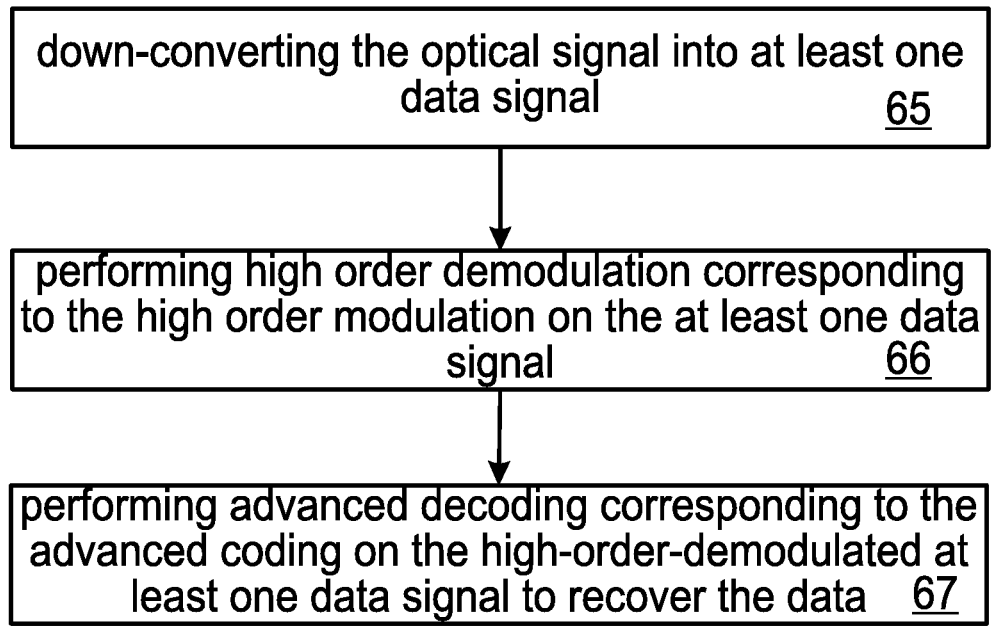
FIG. 8 shows a flow chart of a method of receiving an optical signal according to a first embodiment of the invention.

As shown in FIG. 8, in step 65, the optical signal received from a transmitter is down-converted into $N_r$ data signals. Specifically, the optical signal is separated into $N_r$ optical sub-band signals, then the $N_r$ optical sub-band signals are down-converted into $N_r$ RF sub-band signals, respectively; finally, the $N_r$ RF sub-band signals are RF-demodulated into $N_r$ data signals. As described above, the RF signal demodulation may use either single-carrier or OFDM coherent detection schemes, depending on the RF signal modulation scheme used in the transmitter.

High order demodulation, which corresponds to the high order modulation performed at step 62, is performed on the $N_r$ data signals in step 66. For example, when one of M-ray phase shift keying and M-ray quadrature amplitude modulation (M≥4) is performed at the transmitter, the demodulation is performed correspondingly here according to the modulation order M.

In step 67, advanced decoding, which corresponds to the advanced coding performed in step 61, is performed on the $N_r$ high-order-demodulated data signals so as to recover the data originally transmitted. The decoding scheme used here may have the same rate and type as those of the coding scheme used in the transmitter, as described above.

In the first embodiment of the invention, the data signals, each of which contains a part of data to be transmitted, are encoded and high-order-modulated before optically modulated onto the optical tones. In such solution, an error floor may be caused by the encoder, and an effect of burst errors occurring in the transmission and other adverse effects may also exist. To eliminate these adverse effects, a second embodiment of the invention is proposed.

Figure 9:
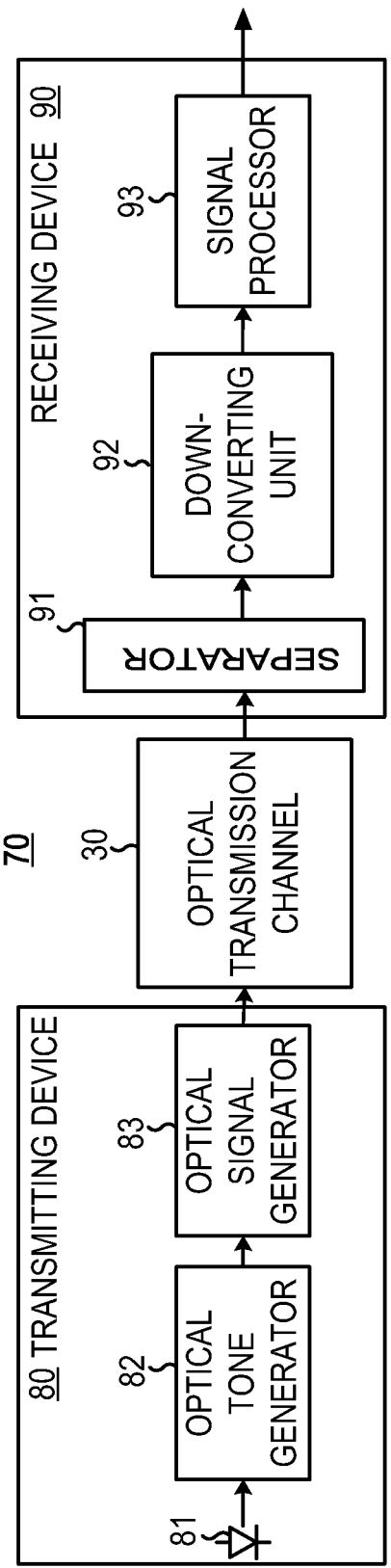
FIG. 9 shows a schematic configuration of a high speed long-haul optical communication system according to a second embodiment of the present invention.

FIG. 9 shows a schematic configuration of a high speed (e.g. over 1-Tb/s) long-haul (e.g. over 1000-km) optical communication system according to a second embodiment of the present invention.

As shown in FIG. 9, the optical communication system 70 comprises a transmitter (also referred to as a transmission device or a transmitting device) 80, the optical transmission channel 30, and a receiver (also referred to as a receiving device) 90. The transmitter 80 according to the second embodiment of the invention is described.

The transmitter 80 transmits an optical signal containing data to the receiver 90, and comprises an optical source 81, an optical tone generator 82, and an optical signal generator 83.

The optical source 81, which may be a single laser source, generates a CW optical carrier at a predetermined wavelength, and the optical tone generator 82 generates $N_t$ optical tones from the single optical source. The optical signal generator 83 generates the optical signal, and then transmits the optical signal to the receiver 90 via the optical transmission channel 30. The optical source 81 and the optical tone generator 82 in the transmitter 80 are respectively the same as the optical source 21 and the optical tone generator 22 described above, thus descriptions thereof are omitted here for simplicity.

Figure 10:
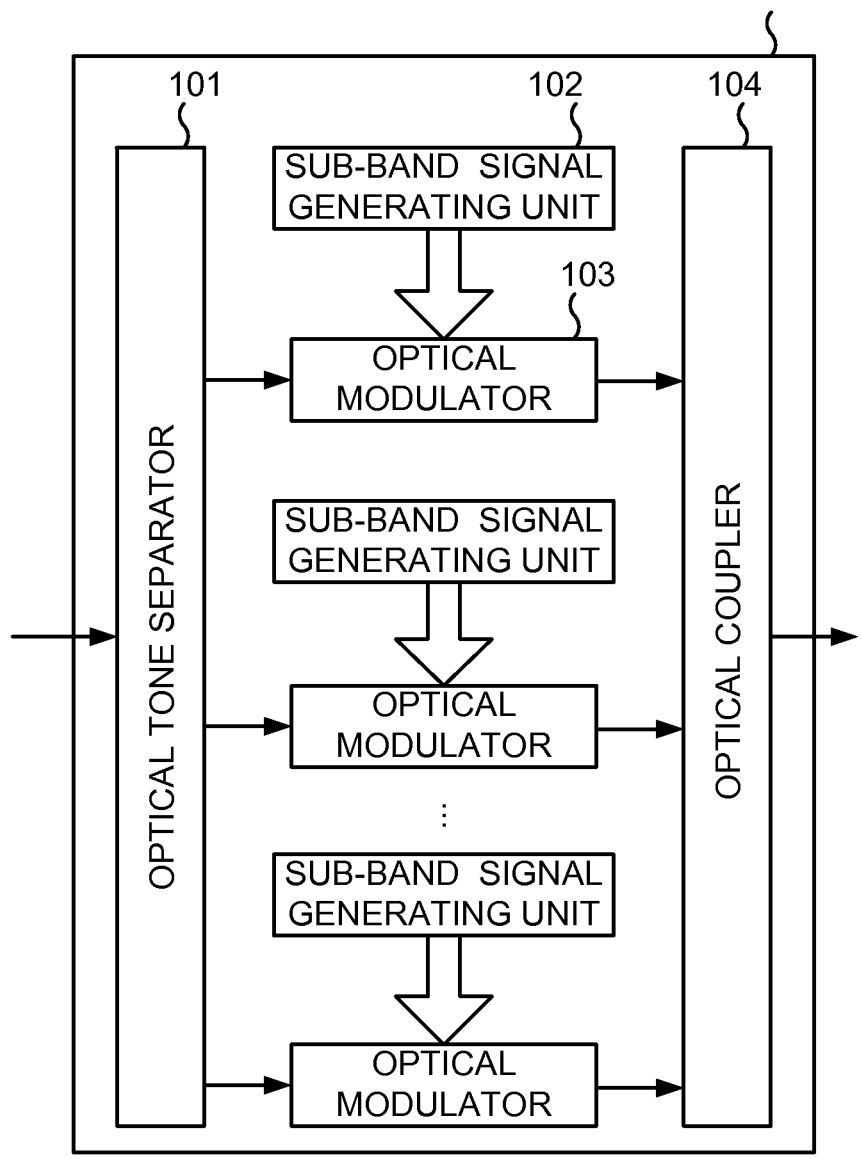
FIG. 10 is a block diagram illustrating an optical signal generator as shown in FIG. 8 in accordance with the present invention.

FIG. 10 is a block diagram showing the optical signal generator 83. As shown in FIG. 10, the optical signal generator 83 includes an optical tone separator 101, $N_t$ RF sub-band signal generating units 102 and $N_t$ associated optical modulator 103, and an optical coupler 104.

The optical tone separator 101 separates the $N_t$ optical tones provided from the optical tone generator 82 into $N_t$ channels ($N_t$ sub-bands), and provides each of the optical tones into a corresponding one of the optical modulators 103. For example, the optical tone separator 101 may include a plurality of band-pass filters, each of which filters the $N_t$ optical tones so as to select one of them in each channel, and provides it to a corresponding optical modulator 103.

The $N_t$ RF sub-band signal generating units 102 generate $N_t$ RF sub-band signals carrying all data to be transmitted, each of which carries a part of the data. Specifically, each of the RF sub-band signal generating units 102 generates one RF sub-band signal, which may be a single-carrier data signal or an OFDM data signal, and outputs the RF sub-band signal into an associated optical modulator 103. Then, the optical modulator 103 optically modulates the RF sub-band signal onto a corresponding optical tone provided from the optical tone separator 101 to form an optical sub-band signal, i.e. up-converts the RF sub-band signal from the electrical domain to the optical domain. Thus, each optical sub-band signal occupies a part of the whole signal band.

The optical coupler 104 combines the $N_t$ optical sub-band signals outputted from the respective optical modulators into the optical signal and outputs the optical signal.

In the following, the sub-band signal generating units 102 will be described in detail below with reference to FIG. 11. As shown in FIG. 11, each of the sub-band signal generating unit 102 comprises an outer encoder 111, an interleaver 112, an inner encoder 113, a mapper 114, a RF signal modulator 115, and digital-to-analog converters (DACs) 116.

As described above, the sub-band signal generating units 102 generate RF sub-band signals each of which contains a part of data to be transmitted. Therefore, a data source (not shown in this figure) provides each of the data signals to a respective one of the sub-band signal generating units 102 and thus to the outer encoder 111 therein.

The outer encoder 111 encodes the data signal so as to eliminate a potential error floor which may be caused by the downstream inner encoder 113. As an example, the outer encoder 111 may use Reed-Solomon RS(255, 239) to encode the data signal, so as to correct randomly distributed errors with a bit error ratio (BER) under $\sim 2 \times 10^{-3}$.

The interleaver 112 is arranged between the outer encoder 111 and the inner encoder 113, and interleaves the outer-coded data signal outputted from the outer encoder 111 so as to avoid an effect of burst error.

The inner encoder 113 performs advanced coding on the interleaved data signal, and then provides the coded data signal to the mapper 114. The advanced coding performed by the inner encoder 113 is the same as that in the first embodiment, and thus will not be described here for simplicity.

The mapper 114 maps the coded data signal onto high order modulation, i.e. performs high order modulation on the coded data signal. The high order modulation performed by the mapper 114 is the same as that in the first embodiment, and thus will not be described here for simplicity.

The RF signal modulator 115 is actually a single-carrier or OFDM signal generating unit, and generates a RF sub-band signal (single-carrier or OFDM signal) from the high-order-modulated data signal, as described with reference to FIG. 3. The generated RF sub-band signal is outputted to the digital-to-analog converters (DACs) 116 to be converted into an analog sub-band signal and then outputted.

Hereinafter, the receiver 90 according to the second embodiment of the embodiment will be described with reference to FIGS. 9 and 12.

The receiver 90 receives the optical signal and recovers the data therefrom. As shown in FIG. 9, the receiver 90 comprises a separator 91 which separates the optical signal to $N_r$ optical sub-band signals, a down-converting unit 92 which down-converts the $N_r$ optical sub-band signals into $N_r$ RF sub-band signals (in the electrical domain), respectively, and $N_r$ signal processors 93 for down-converting the $N_r$ RF sub-band signals into $N_r$ data signals, and performing advanced decoding, which corresponds to the advanced coding performed at the transmitting device, and high order demodulation, which corresponds to the high order modulation performed at the transmitter, on the $N_r$ data signals respectively so as to recover the data originally transmitted.

The separator 91 and the down-converting unit 92 are the same as the separator 54 and the down-converting unit 55, thus descriptions thereof are omitted here for simplicity.

As shown in FIG. 12, each of the signal processors 93 comprises one or more analog-to-digital converters (ADCs) 121 (only one ADC is shown in FIG. 12), a RF signal demodulator 122, a demapper 123, an inner decoder 124, a de-interleaver 125, and an outer decoder 126.

The ADCs 121 may be one or more than one high speed ADCs, and are used to sample the high speed analog sub-band signal outputted from the corresponding polarization diversity optical hybrid in the down-converting unit 62, so as to convert the analog sub-band signal into a digital RF sub-band signal.

As described above, the RF sub-band signal generated at the transmitter 80 may be a single-carrier signal or an OFDM signal. Correspondingly, the RF signal demodulator 122 RF-demodulates the RF sub-band signal into a data signal by using either single-carrier or OFDM coherent detection schemes. Preferably, modules for performing several DSP procedures, such as frequency offset estimation, channel estimation, phase noise estimation, etc., are further integrated in the RF signal demodulator 122 to eliminate noises in the signal and thus improve quality of the signal.

The demapper 123 performs high order demodulation, which corresponds to the high order modulation performed at the transmitter, on the data signal outputted from the RF signal demodulator 122, so as to detect the signal from the constellations constructed in the RF signal demodulator 122. For example, when the transmitter 80 performs one of M-ray phase shift keying and M-ray quadrature amplitude modulation (M≥4), the demapper 123 performs corresponding demodulation according to the modulation order M.

The inner decoder 124 performs advanced decoding, which corresponds to the advanced coding performed at the transmitter, on the high-order-demodulated data signal, so as to recover the data bits contained therein. The high order demodulation performed by the inner decoder 124 is the same as that described in the first embodiments, and thus is not described in detail here.

The de-interleaver 125 de-interleaves the decoded signal in a manner corresponding to the interleaving manner employed in the interleaver 112, so as to reconstruct the data contained therein.

The outer decoder 126 then decodes the reconstructed data in a decoding manner corresponding to the coding scheme employed in the outer encoder 111.

The data outputted from the respective signal processors 93 are the recovered data corresponding to the data transmitted from the transmitter.

In the second embodiment of the invention, devices such as the outer encoder, the interleaver, the outer decoder, the de-interleaver, or the like are added into the system. Thus, the error floor which may be caused by the downstream inner encoder, and other adverse effects may be eliminated, the quality of the transmitted signal is further improved, and the sensitivity of the system is increased.

Hereinafter, an optical communication method, a method for transmitting an optical signal, and a method for receiving an optical signal according to a second embodiment of the invention is described. It is to be noted that, the steps in the second embodiments which are the same as those in the first embodiment will be described briefly or not described here for simplicity.

In the optical communication method according to the second embodiment of the invention, the transmitter 80 transmits an optical signal containing data via an optical transmission channel, and then, the receiver 90 receives the optical signal, and recovers the data.

FIG. 13 shows a flow chart of the method of transmitting the optical signal according to the second embodiment of the invention, which may be executed in the transmitter 80. As shown in FIG. 13, in step 130, $N_t$ optical tones are generated. Then, in step 131, an outer coding, such as Reed-Solomon coding described above, is performed on $N_t$ data signals respectively, each of the $N_t$ data signals carrying a part of the data to be transmitted.

The $N_t$ data signals are interleaved in step 132, and then in step 133, advanced coding as described above is performed on the $N_t$ data signals. In step 134, high order modulation is performed on the coded $N_t$ data signals. The high order modulation is the same as that described in the first embodiment, and thus will not be described in detail.

Next, $N_t$ RF sub-band signals are generated from the respective high-order-modulated data signals in step 135. As described above, the generated sub-band signals may be single-carrier signals or OFDM signals.

Then, after being subjected to a digital-to-analog conversion, in step 136, the $N_t$ RF sub-band signals are optically modulated onto the $N_t$ optical tones generated in step 130, so as to generate $N_t$ optical sub-band signals. Finally, the $N_t$ optical sub-band signals are combined into the optical signal to be outputted in step 137.

Now, the method of receiving an optical signal according to the second embodiment of the invention, which may be executed in the receiver 80, is described with reference to FIG. 14.

Steps 140 to 144 shown in FIG. 14 are respectively similar to steps 65 to 67 shown in FIG. 8, and thus are described in brief here.

In step 140, the received optical signal is separated into $N_r$ optical sub-band signals, each of which occupies a sub-band of the whole band that the transmission of the signal occupies. In step 141, the $N_r$ optical sub-band signals are down-converted into $N_r$ RF sub-band signals. In step 142, the $N_r$ RF sub-band signals are RF-demodulated into $N_r$ data signals, respectively. In step 143, high order demodulation, which corresponds to the high order modulation performed at step 134, is performed on the $N_r$ data signals. Subsequently, in step 144, advanced decoding, which corresponds to the advanced coding performed in step 133, is performed on the $N_r$ high-order-demodulated data signals.

In step 145, the decoded data signals are de-interleaved in a manner corresponding to the interleaving manner used in step 132. Then, in step 146, outer decoding, which corresponds to the outer coding performed in step 131, is performed on the de-interleaved data signals, so as to recover the data contained therein. Thus, the data originally transmitted may be obtained.

By the transmitting device, the receiving device, the optical communication system, and the associated methods according to the present invention, high speed (e.g., over 1 Tb/s) transmission per single channel over a long-haul distance (e.g. over 1000-km) with error-free recovery may be achieved.

The embodiments of the invention may be implemented in hardware, software, firmware, or a combination thereof. For example, in the signal processor 93 of the second embodiment of the invention, the ADC 121 may be implemented in hardware, and the other components may be implemented in software.

While exemplary embodiments of the present invention are described here, these embodiments are shown by way of example. It should be understood that there is no intent to limit exemplary embodiments of the present invention to the particular forms disclosed. On the contrary, exemplary embodiments are to cover all modifications, equivalents, and alternatives falling within the scope of the present invention.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of exemplary embodiments of the present invention. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between" "adjacent" versus "directly adjacent" etc.).

The terminology used herein is for the purpose of describing particular embodiments only and is not intended to be limiting of exemplary embodiments of the present invention. As used herein, the singular forms "a," "an," and "the" are intended to include the plural forms as well, unless the context clearly indicates otherwise. As used herein, the terms "and/or" and "at least one of" include any and all combinations of one or more of the associated listed items. It will be further understood that the terms "comprises," "comprising," "includes," and/or "including" when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

While some exemplary embodiments of the present invention have been described, it will be obvious that the same may be varied in many ways. The description of the present inven-

The invention claimed is:

1. A transmitting device for transmitting an optical signal containing data, comprising:
   an optical tone generator for generating a plurality of optical tones at different wavelengths, wherein the optical tone generator includes two or more cascaded optical tone generating units, a first optical tone generating unit of the optical tone generator is an optical intensity modulator which generates multiple optical tones at different wavelengths from a single laser source, a spacing of the optical tones of the first optical tone generating unit is provided by a first clock source, other optical tone generating units of the optical tone generator generates more optical tones from inputted optical tones, said other optical tone generating units each include a re-circulating frequency shifter which includes an optical I/Q modulator, Erbium doped fiber amplifiers, and optical filters, and a spacing of the optical tones of the other optical tone generating units is provided by other clock sources other than the first clock source;
   a plurality of encoders, each encoder performing advanced coding on an associated data signal of data signals to generate an associated coded data signal, each associated data signal carrying a corresponding part of the data;
   a plurality of mappers, each mapper coupled to an associated encoder for receiving the corresponding associated coded data signal, each mapper performing high order modulation on the corresponding associated coded data signal, wherein a number of the optical tones is equal to a number of the encoders and equal to a number of mappers; and
   an up-converter, coupled to the plurality of mappers, for up-converting the associated high-order-modulated data signal in each mapper into the optical signal to be outputted through the plurality of optical tones, wherein each of the optical tones at a different wavelength is used for the corresponding associated high-order-modulated data signal,
   wherein the advanced coding has a net coding rate between 20%-85% and a net coding gain above 5 dB at BER=$10^{-13}$ compared to BER-versus-OSNR performance of uncoded transmission.

2. The device as recited in claim 1, wherein the optical tone generator comprises a plurality of optical tone generating units for generating the plurality of optical tones from a single laser source.

3. The device as recited in claim 2, wherein the optical tone generator further comprises:
   an amplifier arranged between adjacent optical tone generating units;
   a plurality of clock sources for providing clock references to the corresponding plurality of optical tone generating units, respectively, and
   a common reference for locking the plurality of clock sources.

4. The device as recited in claim 1, wherein the advanced coding includes one of low density parity-check coding and Turbo coding.

5. The device as recited in independent claim 1, wherein the high order modulation is one of M-ray phase shift keying and M-ray quadrature amplitude modulation, M≥4.

6. The device as recited in claim 1, wherein the up-converter includes:
   a plurality of RF signal modulators for RF-modulating the plurality of high-order-modulated data signals into a plurality of RF sub-band signals;
   a plurality of optical modulators for optically modulating the plurality of RF sub-band signals onto the respective optical tones for generating at least one optical sub-band signals; and
   a coupler for combining the optical sub-band signals into the optical signal.

7. The device as recited in claim 6, wherein each of the RF sub-band signals is a single-carrier signal or an orthogonal frequency division multiplexing signal.

8. An optical communication system, comprising:
   a transmitting device including
      an optical tone generator for generating a plurality of optical tones at different wavelengths, wherein the optical tone generator includes two or more cascaded optical tone generating units, a first optical tone generating unit of the optical tone generator is an optical intensity modulator which generates multiple optical tones at different wavelengths from a single laser source, a spacing of the optical tones of the first optical tone generating unit is provided by a first clock source, other optical tone generating units of the optical tone generator generates more optical tones from inputted optical tones, said other optical tone generating units each include a re-circulating frequency shifter which includes an optical I/Q modulator, Erbium doped fiber amplifiers, and optical filters, and a spacing of the optical tones of the other optical tone generating units is provided by other clock sources other than the first clock source;
      a plurality of encoders, each encoder performing advanced coding on an associated data signal of the data signals to generate an associated coded data signal, each associated data signal carrying a corresponding part of the data;
      a plurality of mappers, each mapper coupled to an associated encoder for receiving the corresponding associated coded data signal, each mapper performing high order modulation on the corresponding associated coded data signal, wherein a number of the optical tones is equal to a number of the encoders and equal to a number of mappers; and
      an up-converter, coupled to the plurality of mappers, for up-converting the associated high-order-modulated data signal in each mapper into the optical signal to be outputted through the at least one optical tone, wherein each of the optical tones at a different wavelength is used for the corresponding associated high-order-modulated data signal;

a receiving device, coupled to the transmitting device, including
- a down-converter for down-converting the optical signal into a plurality of data signals;
- a plurality of demappers for performing high order demodulation corresponding to the high order modulation on the plurality of data signals; and
- a plurality of decoders for performing advanced decoding corresponding to the advanced coding on the plurality of high-order demodulated data signals to recover the data, wherein a number of the plurality of data signals is equal to a number of the plurality of demappers, and equal a number of the plurality of decoders;

wherein one demapper corresponds to one corresponding decoder which corresponds to one data signal, wherein the advanced coding has a net coding rate between 20%-85% and a net coding gain above 5 dB at BER=$10^{-13}$ compared to BER-versus-OSNR performance of un-coded transmission.

9. A method for transmitting an optical signal containing data, comprising:

generating a plurality of optical tones at different wavelengths by an optical tone generator, wherein the optical tone generator includes two or more cascaded optical tone generating units, a first optical tone generating unit of the optical tone generator is an optical intensity modulator which generates multiple optical tones at different wavelengths from a single laser source, a spacing of the optical tones of the first optical tone generating unit is provided by a first clock source, other optical tone generating units of the optical tone generator generates more optical tones from inputted optical tones, said other optical tone generating units each include a re-circulating frequency shifter which includes an optical I/O modulator, Erbium doped fiber amplifiers, and optical filters, and a spacing of the optical tones of the other optical tone generating units is provided by other clock sources other than the first clock source;

performing advanced coding on each of the data signals respectively, each of the data signals carrying a corresponding part of the data;

performing high order modulation on each of the coded data signals, respectively, wherein a number of the optical tones is equal to a number of the data signals and equal to a number of the coded data signals; and up-converting the high-order-modulated data signals into the optical signal to be outputted through the plurality of optical tones, wherein, each of the optical tones at different wavelengths is used for the corresponding high-order-modulated data signal, wherein the advanced coding has a net coding rate between 20%-85% and a net coding gain above 5 dB at BER=$10^{-13}$ compared to BER-versus-OSNR performance of un-coded transmission.

10. The method as recited in claim 9, wherein the optical tones are generated by one optical tone generating unit from a single laser source.

11. The method as recited in claim 9, wherein the advanced coding includes one of low density parity-check coding and Turbo coding.

12. The method as recited in claim 9, wherein the high order modulation is one of M-ray phase shift keying and M-ray quadrature amplitude modulation, M≥4.

13. The method as recited in claim 9, wherein the step of up-converting the high-order-modulated data signals comprises:
- RF-modulating the modulated data signals into a plurality of RF sub-band signals;
- optically modulating the plurality of RF sub-band signals onto the plurality of optical tones to generate a plurality of optical sub-band signals; and
- combining the plurality of optical sub-band signals into the optical signal.

14. The method as recited in claim 13, wherein each of the RF sub-band signals is a single-carrier signal or an orthogonal frequency division multiplexing signal.

* * * * *